US012797850B2

(12) United States Patent
Ono

(10) Patent No.: US 12,797,850 B2
(45) Date of Patent: Nov. 17, 2026

(54) HANDLING DEVICE AND FLUID HANDLING SYSTEM

(71) Applicant: Enplas Corporation, Saitama (JP)

(72) Inventor: Koichi Ono, Saitama (JP)

(73) Assignee: Enplas Corporation, Saitama (JP)

( * ) Notice: Subject to any disclaimer, the term of this patent is extended or adjusted under 35 U.S.C. 154(b) by 662 days.

(21) Appl. No.: 18/275,241

(22) PCT Filed: Feb. 2, 2021

(86) PCT No.: PCT/JP2021/003662
§ 371 (c)(1),
(2) Date: Aug. 1, 2023

(87) PCT Pub. No.: WO2022/168142
PCT Pub. Date: Aug. 11, 2022

(65) Prior Publication Data
US 2024/0082837 A1 Mar. 14, 2024

(51) Int. Cl.
*B01L 3/00* (2006.01)

(52) U.S. Cl.
CPC ... *B01L 3/50273* (2013.01); *B01L 2300/0803* (2013.01); *B01L 2300/087* (2013.01); *B01L 2300/0877* (2013.01); *B01L 2300/123* (2013.01); *B01L 2400/0481* (2013.01); *B01L 2400/0638* (2013.01)

(58) Field of Classification Search
USPC .......................................................... 422/505
See application file for complete search history.

(56) References Cited

U.S. PATENT DOCUMENTS 8,425,863 B2 * 4/2013 Van Haag ................. F15C 5/00
251/12

FOREIGN PATENT DOCUMENTS

JP 2012-252000 12/2012

* cited by examiner

*Primary Examiner* — Xiaoyun R Xu

(57) ABSTRACT

The fluid handling device has a plurality of first chambers, a second chamber, a membrane pump including a diaphragm, a plurality of first flow paths by which each of the plurality of first chambers and the membrane pump are connected, a plurality of second flow paths by which each of the plurality of first chambers and the second chamber are connected, a plurality of first membrane valves positioned respectively in the plurality of first flow paths, and a plurality of second membrane valves positioned respectively in the plurality of second flow paths.

7 Claims, 8 Drawing Sheets

HANDLING DEVICE AND FLUID HANDLING SYSTEM

TECHNICAL FIELD

The present invention relates to a fluid handling device and a fluid handling system.

BACKGROUND ART

In recent years, microwell plates, channel chips, and the like are used to analyze, for example, cells, proteins, and nucleic acids. Microwell plates and channel chips are advantageous such that only a small amount of reagents and samples is required for analysis, thus are expected to be used in a variety of applications such as clinical tests, food tests, and environment tests.

For example, Patent Literature (hereinafter, referred to as PTL) 1 discloses a microfluidic device. This microfluidic device is composed of an upper substrate, a lower substrate, and an elastomer sheet. A through hole is formed in the elastomer sheet, and a reaction chamber is formed by placing the elastomer sheet between the upper substrate and the lower substrate. In addition, the upper substrate is provided with a port for taking liquid into and from the reaction chamber.

CITATION LIST

Patent Literature

PTL 1

Japanese Patent Application Laid-Open No. 2012-252000

SUMMARY OF INVENTION

Technical Problem

In a microfluidic device as described in PTL 1, a large-scale device is required, for example, to automate operations such as mixing various types of liquids, mixing and reacting liquids, and discarding reacted liquids.

An object of the present invention is to provide a fluid handling device capable of performing operations such as mixing, reacting, and discarding fluids without requiring a large-scale device. Another object of the present invention is to provide a fluid handling system including the fluid handling device.

Solution to Problem

A fluid handling device of the present invention includes: a plurality of first chambers; a second chamber; a membrane pump including a diaphragm; a plurality of first channels each connecting a corresponding one of the plurality of first chambers with the membrane pump; a plurality of second channels each connecting a corresponding one of the plurality of first chambers with the second chamber; a plurality of first membrane valves respectively disposed in the plurality of first channels; and a plurality of second membrane valves respectively disposed in the plurality of second channels.

A fluid handling system of the present invention includes the above fluid handling device; a first pressing member for pressing the plurality of first membrane valves and the plurality of second membrane valves; and a second pressing member for pressing the membrane pump.

Advantageous Effects of Invention

The present invention can provide a fluid handling device capable of performing operations such as mixing, reacting, and discarding fluids without requiring a large-scale device. In addition, the present invention can provide a fluid handling system including the fluid handling device.

DESCRIPTION OF EMBODIMENTS

Hereinafter, an embodiment of the present invention will be described in detail with reference to the accompanying drawings.

Configuration of Fluid Handling System and Fluid Handling Device

In the following, a fluid handling system and a fluid handling device according to the present embodiment will be described.

Figure 1:
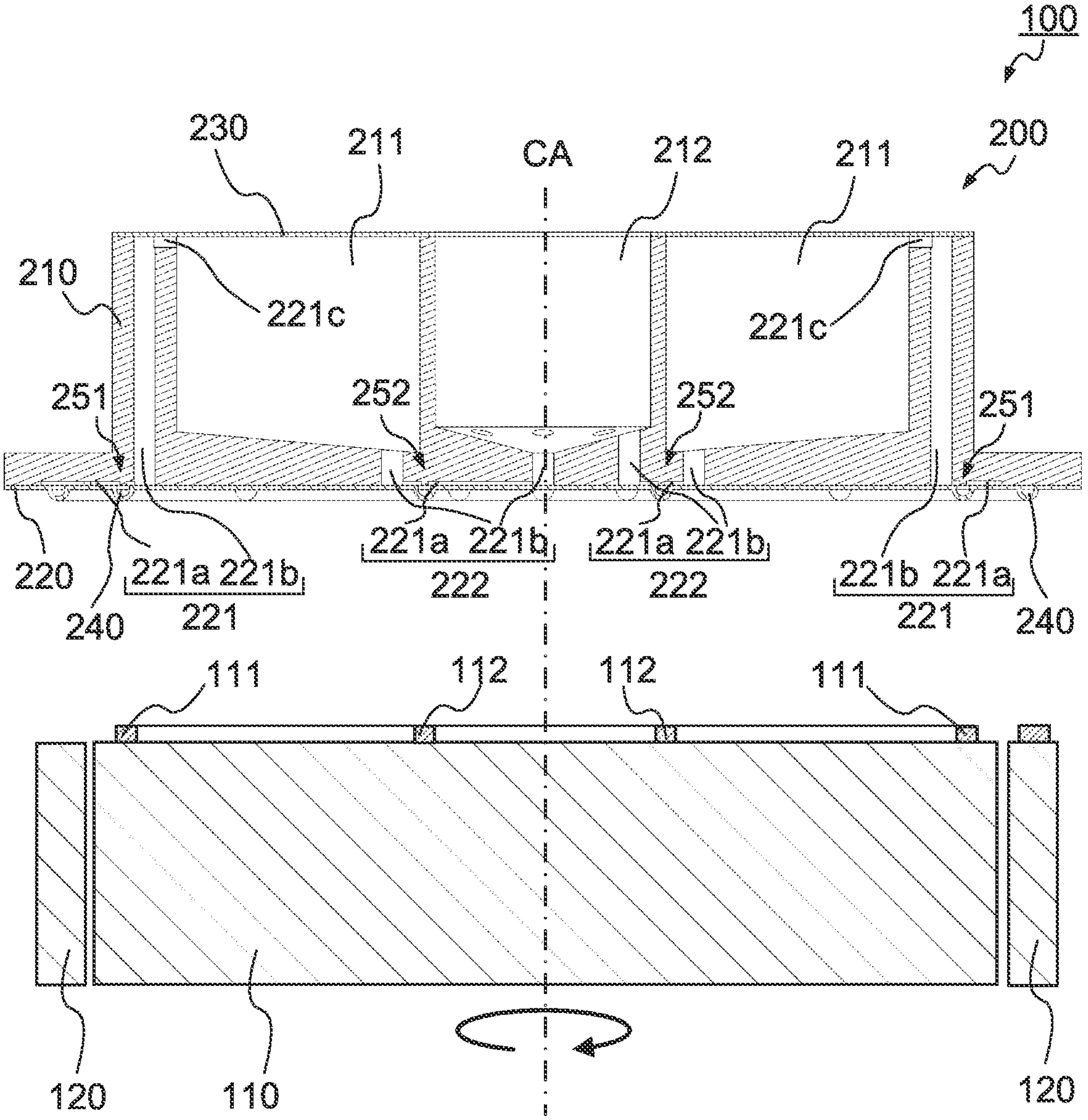
FIG. 1 is a cross-sectional view illustrating the configuration of a fluid handling system according to an embodiment.
Figure 2:
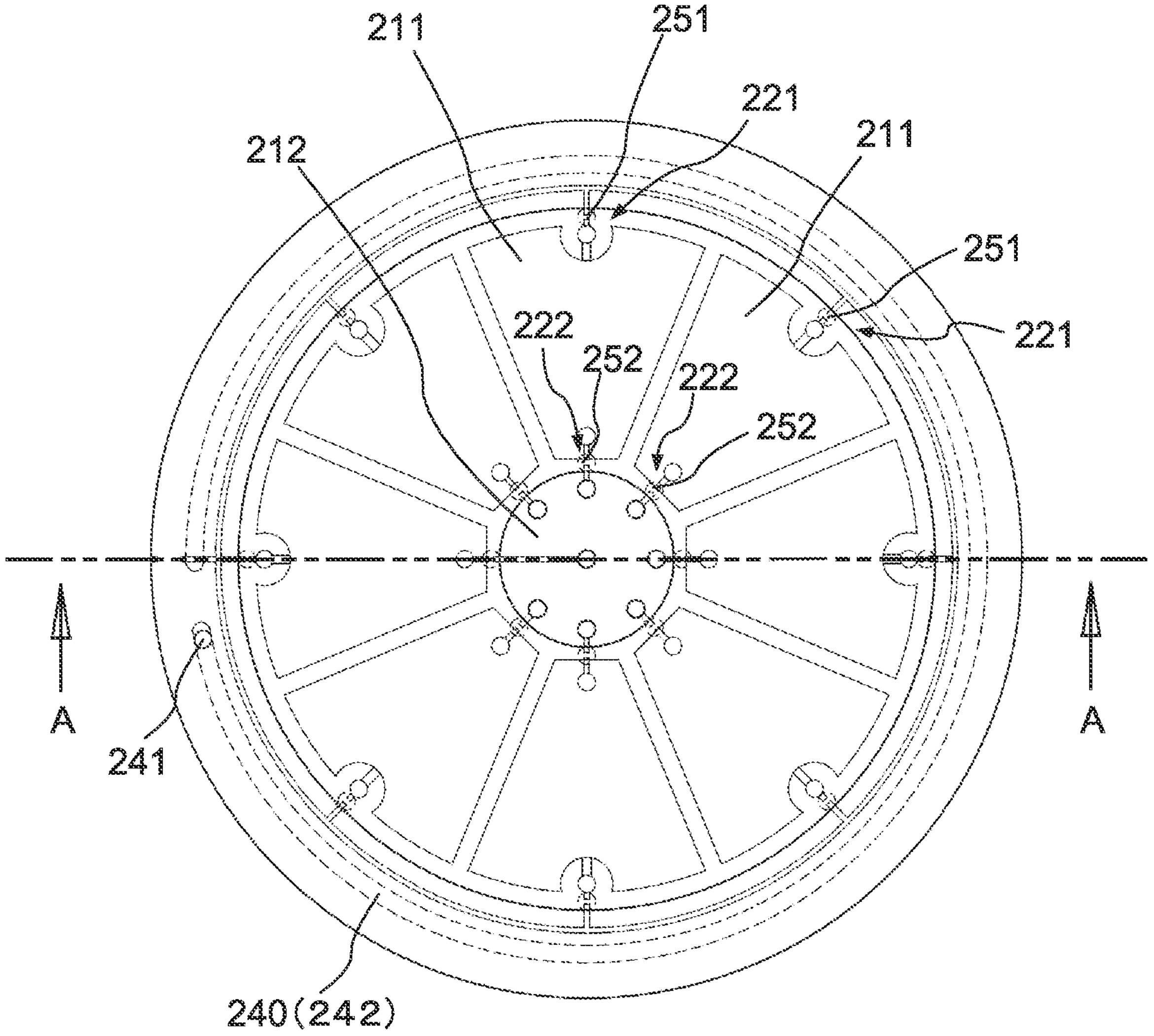
FIG. 2 is a plan view of the fluid handling system according to the embodiment.

FIG. 1 is a cross-sectional view illustrating the configuration of fluid handling system 100 according to the present embodiment. FIG. 2 is a plan view of fluid handling system 100 (fluid handling device 200) according to the present embodiment. In FIG. 2, lid 230 located on the front side of fluid handling device 200 is omitted, and components such as channels located on the back side of fluid handling device 200 are indicated by dashed lines. The cross-sectional view of fluid handling system 100 in FIG. 1 is a cross-sectional view taken along line A-A in FIG. 2.

As illustrated in FIG. 1, fluid handling system 100 includes first pressing member 110, second pressing member 120, and fluid handling device 200. First pressing member 110 and second pressing member 120 press the diaphragm of a pump or the diaphragm of a valve provided in fluid handling device 200.

First pressing member 110 and second pressing member 120 are independently rotated about central axis CA by an external driving mechanism (not illustrated). This central axis CA (the rotation axis of first pressing member 110 and second pressing member 120) passes through the centers of below described first, second, and third circles. Fluid handling device 200 includes a plurality of first membrane valves 251, a plurality of second membrane valves 252, and membrane pump 240. First pressing member 110 is disposed to contact the plurality of first membrane valves 251 and the plurality of second membrane valves 252, and second pressing member 120 is disposed to contact membrane pump 240. FIG. 1 illustrates fluid handling device 200 separately from first pressing member 110 and second pressing member 120 for easy understanding of the configuration of fluid handling system 100.

Figure 3A:
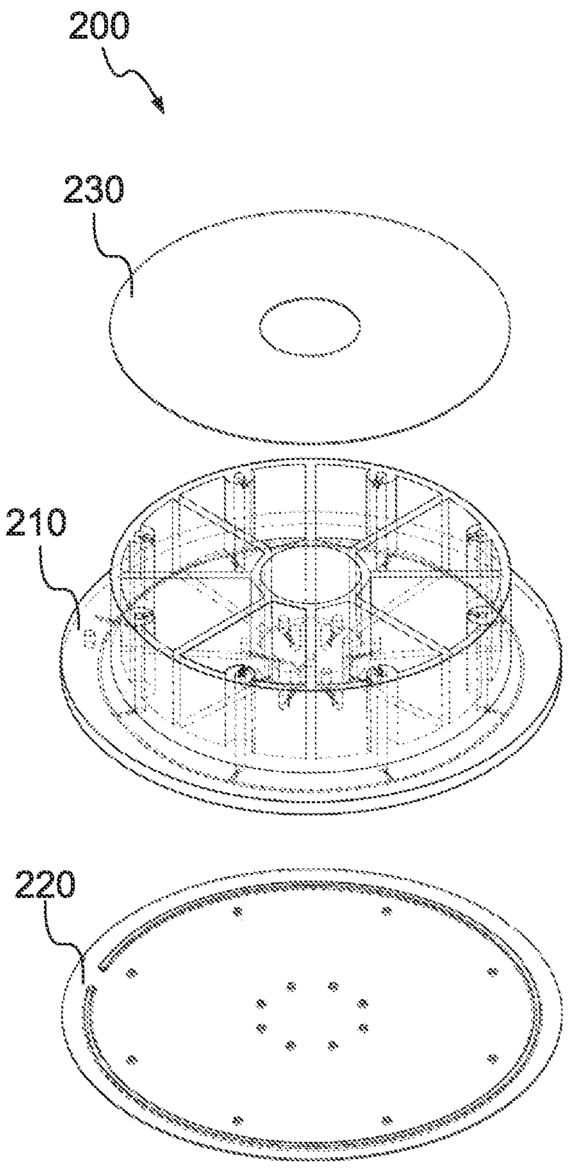
FIGS. 3A and 3B are exploded perspective views illustrating the configuration of the fluid handling device according to the embodiment.
Figure 3B:
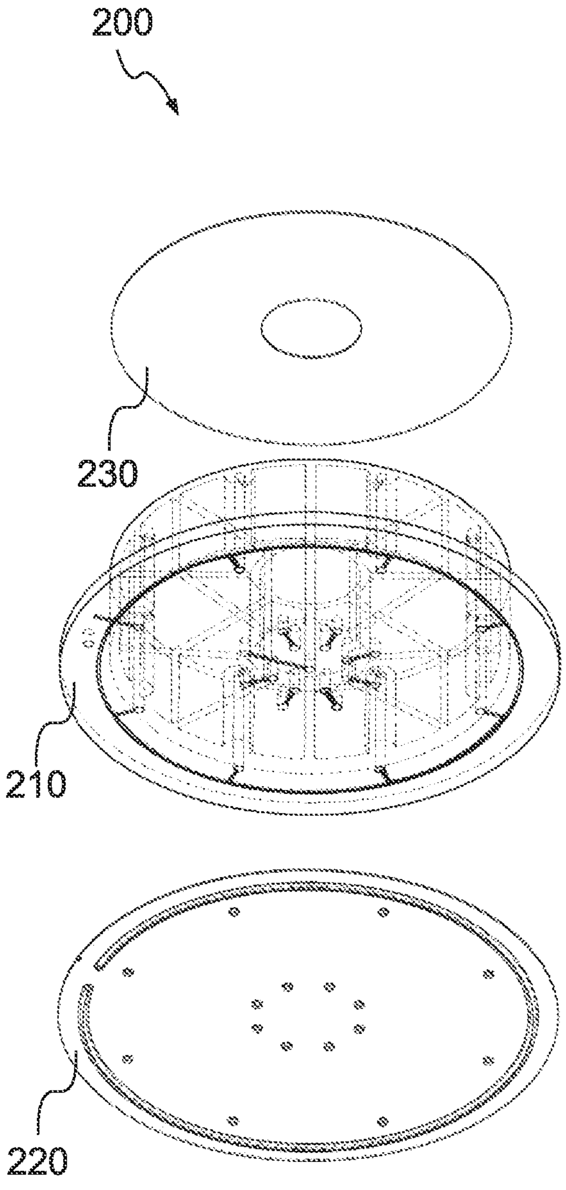

FIGS. 3A and 3B are exploded perspective views illustrating the configuration of fluid handling device 200. FIG. 3A is an exploded perspective view of fluid handling device 200 viewed from above, and FIG. 3B is an exploded perspective view of fluid handling device 200 viewed from below. In addition, in FIGS. 3A and 3B, some components are illustrated as transparent so that the internal structure can be understood.

As illustrated in FIGS. 3A and 3B, fluid handling device 200 includes main body 210, film 220, and lid 230 (see also FIG. 1). Lid 230 is joined to the top of main body 210 and film 220 is joined to the bottom of main body 210, thereby forming fluid handling device 200. Joining is performed, for example, by fusion.

A plurality of grooves and a plurality of through holes all configured to serve as channels are formed on the back side of main body 210. A plurality of recesses configured to serve as chambers for housing fluid are formed on the front side of main body 210.

Film 220 is a circular member and is joined to the bottom (bottom surface) of main body 210 so as to block the openings of the plurality of grooves and the plurality of through holes formed on the back side of main body 210. The plurality of grooves and the plurality of through holes blocked by film 220 serve as channels for fluids, such as reagents, liquid samples, washing liquids, gases, and powders, to flow therethrough. Some regions of film 220 function as diaphragms each for a pump or a valve.

As illustrated in FIGS. 3A and 3B, lid 230 is a circular member including a circular through hole in the center thereof. Lid 230 is joined to the top (top surface) of main body 210 in such a way that the lid block the openings of a plurality of recesses configured to serve as below described first chamber 211 among the plurality of recesses formed on the front side of main body 210, but does not block the opening of a recess configured to serve as below described second chamber 212 among the plurality of recesses.

Lid 230 may have the following configuration, namely a circular member with no through hole. In this case, lid 230 is joined to the entire surface of the top (top surface) of main body 210 in such a way that the lid block the openings of the plurality of recesses configured to serve as below described first chamber 211 and the opening of the recess configured to serve as below described second chamber 212. A hole may be made in the portion—blocking second chamber 212—of lid 230 for the use.

The material for main body 210 is not limited. For example, the material for main body 210 may be appropriately selected from known resins. The material for main body 210 may be elastic. Examples of the materials for main body 210 include polyethylene terephthalate, polycarbonate, polymethyl methacrylate, polyvinyl chloride, polypropylene, polyether, polyethylene, polystyrene, cyclo-olefine resins, silicone resins, and elastomers.

The thickness of film 220 is not limited as long as the film can function as a diaphragm. For example, the thickness of film 220 is 30 μm or more and 300 μm or less. The material for film 220 is not limited either as long as the film can function as a diaphragm. For example, the material for film 220 may be appropriately selected from known resins. Examples of the materials for film 220 include polyethylene terephthalate, polycarbonate, polymethyl methacrylate, polyvinyl chloride, polypropylene, polyether, polyethylene, polystyrene, cyclo-olefine resins, silicone resins, and elastomers. Film 220 is joined to main body 210 by, for example, heat welding, laser welding, or using an adhesive.

Lid 230 may have any configuration as long as the lid can seal first chambers 211. For example, lid 230 is a film that seals first chambers 211. The thickness of lid 230 is not limited, but is, for example, 30 μm or more and 300 μm or less in such a case. Lid 230 may be a plate thicker than a film or may be a molded body. The material for lid 230 is not limited either as long as the lid can seal first chambers 211. For example, the material for lid 230 may be appropriately selected from known metals and resins. Examples of the materials for lid 230 include polyethylene terephthalate, aluminum, polyethylene, polypropylene, nylon, and ethylene vinyl acetate copolymer. Lid 230 may be a laminate of a plurality of films. Lid 230 is joined to main body 210 by, for example, heat welding, laser welding, or using an adhesive.

As illustrated in FIGS. 1 and 2, fluid handling device 200 includes a plurality of first chambers 211, second chamber 212, a plurality of first channels 221, a plurality of second channels 222, a plurality of first membrane valves 251, a plurality of second membrane valves 252, and membrane pump 240.

First chamber 211 is a bottomed recess for housing a fluid. The number of first chambers 211 is not limited, and is appropriately set according to the application. In the present embodiment, the number of first chambers 211 is 8. In addition, as illustrated FIG. 2, first chambers 211 are disposed on the circumference of a circle so as to surround second chamber 212 in plan view. In the present embodiment, among the eight first chambers 211, one first chamber 211 (the leftmost first chamber 211 in FIG. 2) is used as, for example, a collection chamber for housing a liquid sent from second chamber 212 or as a waste liquid chamber, and the other seven chambers 211 may be used as, for example, reagent chambers for housing fluids to be sent into second chamber 212. Lid 230 is joined to the upper side of first chamber 211 to block the upper side of first chamber 211. In addition, as illustrated in FIG. 1, the bottom of first chamber 211 is preferably configured in such a way that liquid gathers in a specific region. In the present embodiment, as illustrated in FIG. 1, the bottom surface of first chamber 211 includes an inclined surface. The inclined surface becomes lower as the inclined surface approaches central axis CA; thus, when the amount of liquid in first chamber 211 decreases, the liquid gathers in the region on the central axis CA side in first chamber 211.

Second chamber 212 is a bottomed recess to be used for housing a fluid. The number of second chambers 212 is not limited, and is appropriately set according to the application. In the present embodiment, the number of second chambers is one, and as illustrated in FIG. 2, the second chamber is disposed in the center of fluid handling device 200 in plan view. In the present embodiment, the upper side of second chamber 212 is open. In addition, as illustrated in FIG. 1, the bottom of second chamber 212 is preferably configured in such a way that liquid gathers in a specific region. In the present embodiment, as illustrated in FIG. 1, the bottom surface of second chamber 212 includes an inclined surface. The inclined surface becomes lower as the inclined surface approaches central axis CA; thus, when the amount of liquid in second chamber 212 decreases, the liquid gathers in the central region in second chamber 212.

The plurality of first channels 221 and the plurality of second channels 222 are channels through which fluid can move. As illustrated in FIG. 1, one end of first channel 221 is connected to membrane pump 240, and the other end of the first channel is connected to one of the plurality of first chambers 211. One end of second channel 222 is connected to one of the plurality of first chambers 211, and the other end of the second channel is connected to second chamber 212.

Figure 4A:
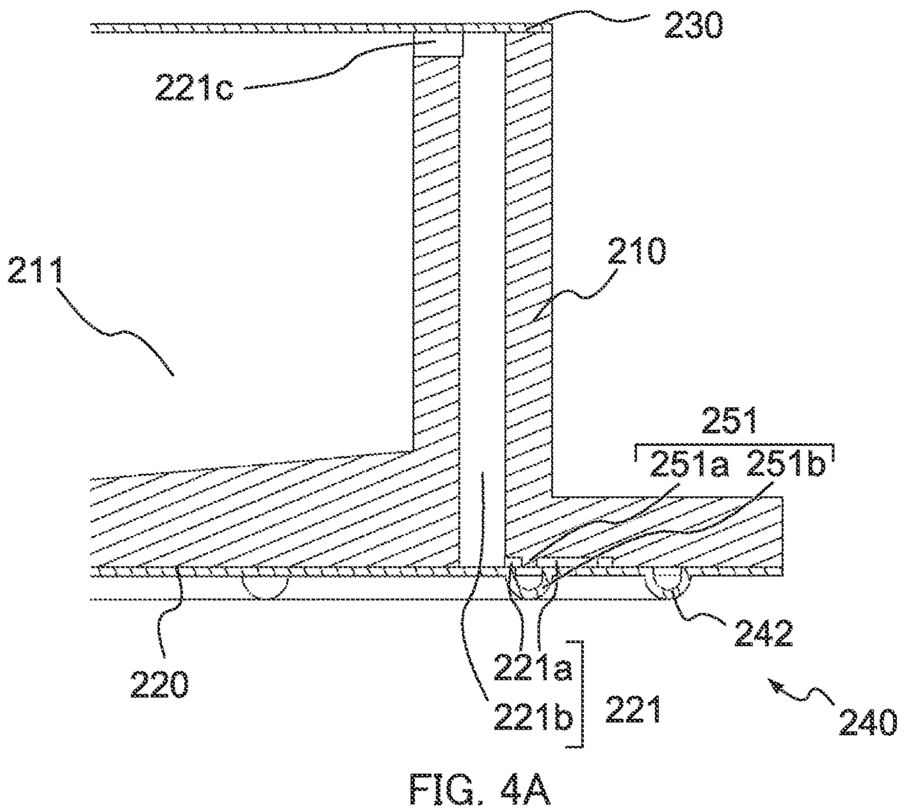
FIGS. 4A and 4B are enlarged cross-sectional views each illustrating part of the fluid handling device according to the embodiment.

In the present embodiment, first channel 221 has first bottom surface side channel 221*a* and first in-body channel (i.e., channel inside the main body) 221*b* as illustrated in FIGS. 1 and 4A. First bottom surface side channel 221*a* is composed of a groove formed in the bottom surface of main body 210 and film 220 blocking the opening of the groove. First in-body channel 221*b* is composed of a through hole formed in main body 210, film 220, and lid 230—the film and the lid blocking the through hole.

In addition, first in-body channel 221*b* includes opening 221*c* that opens to first chamber 211. Opening 221*c* is preferably located at the upper portion so that the inside of first chamber 211 can be pressurized or depressurized through flowing of fluid (for example, air) into and out of first chamber 211. Specifically, in the present embodiment, opening 221*c* is formed from a notch formed at the top of first in-body channel 221*b* and lid 230 disposed on main body 210, as illustrated in FIG. 4A. Therefore, opening 221*c* can be disposed at the topmost portion of first chamber 211.

Figure 4B:
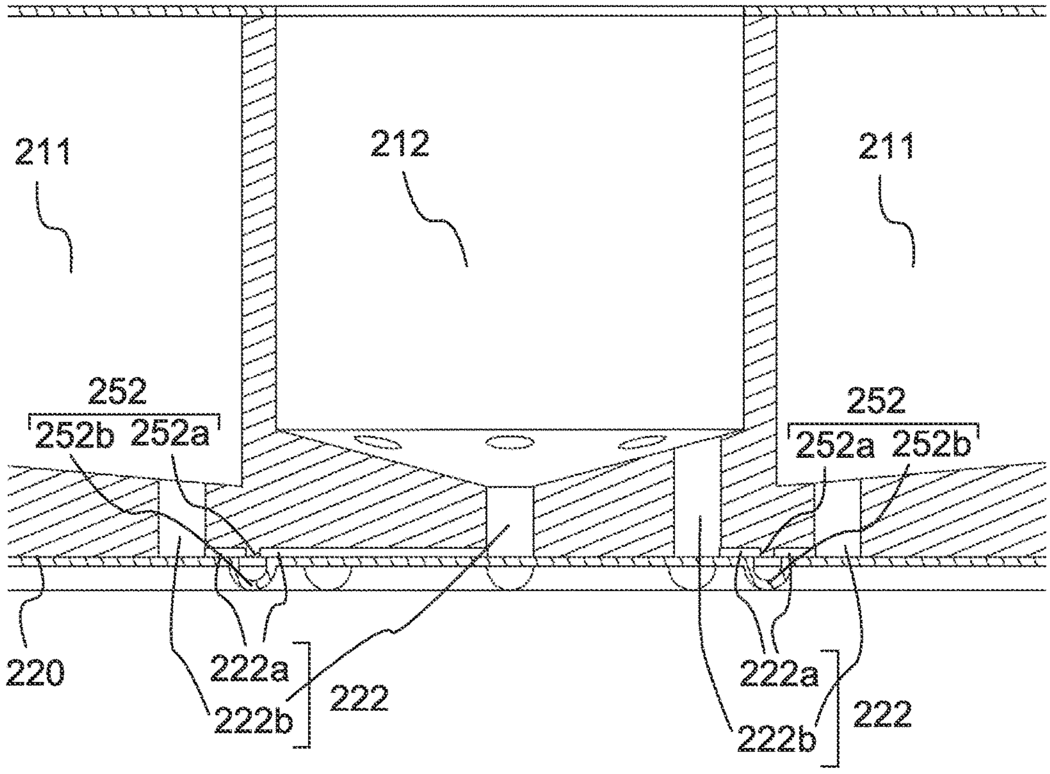

In the present embodiment, second channel 222 includes second bottom surface side channel 222*a* and two second in-body channels 222*b*, as illustrated in FIGS. 1 and 4B. One of the two second in-body channels 222*b* is connected to one end of second bottom surface side channel 222*a*, and the other one of the two second in-body channels 222*b* is connected to the other end of second bottom surface side channel 222*a*. Second bottom surface side channel 222*a* is composed of a groove formed in the bottom surface of main body 210 and film 220 blocking the opening of the groove. Second in-body channel 222*b* is composed of a through hole formed in main body 210 and film 220 blocking the through hole.

One of the two second in-body channels 222*b* opens to first chamber 211 and the other one of the two second in-body channels 222*b* opens to second chamber 212.

As illustrated on the right side of FIG. 4B, one end of second channel 222 (one of the two second in-body channels 222*b*) preferably opens in a region located at a lower position in the bottom of first chamber 211. By disposing second channel 222 to open to first chamber 211 at a lower position in this manner, transferring all the liquid in first chamber 211 to second chamber 212 becomes easier. First chamber 211 on the right side of FIG. 4B is a chamber (reagent chamber) for housing a fluid (liquid) to be sent to second chamber 212.

As illustrated in the center of FIG. 4B, one end of second channel 222 (the other one of the two second in-body channels 222*b*) preferably opens in a region located at a lower position in the bottom of second chamber 212. By disposing second channel 222 to open to second chamber 212 at a lower position in this manner, transferring all the liquid in second chamber 212 to first chamber 211 becomes easier. First chamber 211 on the left side of FIG. 4B is a chamber (e.g., collection chamber or waste liquid chamber) for housing a fluid (liquid) sent from second chamber 212.

The cross-sectional areas and cross-sectional shapes of first channels 221 and second channels 222 are not limited. Herein, a “cross section of a channel” means a cross section—orthogonal to the direction in which a liquid flows—of a channel. In the present embodiment, the cross-sectional shape of each of first bottom surface side channel 221*a* and second bottom surface side channel 222*a* is, for example, a substantially rectangular shape with a side length (width and depth) of about several tens of μm. In addition, in the present embodiment, the cross-sectional shape of each of first in-body channel 221*b* and second in-body channel 222*b* is, for example, a substantially circular shape with a diameter of about several millimeters. The cross-sectional area of each channel may or may not be constant in the direction of the flow of fluid.

As illustrated in FIG. 4A, first membrane valve 251 is disposed in each of first channels 221 described above. Similarly, as illustrated in FIG. 4B, second membrane valve 252 is disposed in each of second channels 222 described above. Opening and closing first membrane valve 251 controls the flow of fluid in first channel 221, and opening and closing second membrane valve 252 controls the flow of fluid in second channel 222.

First membrane valve 251 is a membrane valve (diaphragm valve) for controlling the flow of fluid in first channel 221. In the present embodiment, first membrane valve 251 is a rotary membrane valve whose opening and closing are controlled by the rotation of first pressing member 110 and resulting pressing of a diaphragm. In the present embodiment, the plurality of first membrane valves 251 are disposed on the circumference of a first circle in bottom view (plan view), as illustrated in FIG. 2. Similarly, the plurality of second membrane valves 252 are disposed on the circumference of a second circle that is concentric with and inside the first circle, as illustrated in FIG. 2. The centers of the first circle and the second circle superpose central axis CA.

As illustrated in FIG. 4A, first membrane valve 251 includes partition wall 251*a* and diaphragm 251*b*. Similarly, as illustrated in FIG. 4B, second membrane valve 252 includes partition wall 252*a* and diaphragm 252*b*.

Partition wall 251*a* of first membrane valve 251 is disposed in first channel 221. More specifically, partition wall 251*a* of first membrane valve 251 is disposed in first bottom surface side channel 221*a*. Diaphragm 251*b* of first membrane valve 251 is disposed so as to face partition wall 251*a*.

Similarly, partition wall 252*a* of second membrane valve 252 is disposed in second channel 222. More specifically, partition wall 252*a* of second membrane valve 252 is disposed in second bottom surface side channel 222*a*. Diaphragm 252*b* of second membrane valve 252 is disposed so as to face partition wall 252*a*.

Partition wall 251*a* of first membrane valve 251 functions as a valve seat of a membrane valve (diaphragm valve) for opening and closing the channel between membrane pump 240 and first chamber 211. Similarly, partition wall 252*a* of second membrane valve 252 functions as a valve seat of a membrane valve (diaphragm valve) for opening and closing the channel between first chamber 211 and second chamber 212. The shape and height of each partition wall are not limited as long as the above functions can be exhibited. These partition walls have, for example, a quadrangular prism shape. The height of each partition wall is, for example, the same as the depth of the corresponding channel.

Each of diaphragm 251*b* of first membrane valve 251 and diaphragm 252*b* of second membrane valve 252 is a portion of flexible film 220, and has a substantially spherical crown shape (dome shape) (see FIGS. 4A and 4B). Diaphragm 251*b* and diaphragm 252*b* are disposed on main body 210 so as not to contact and so as to face the opposing partition walls 251*a* and 252*a*, respectively.

Figure 5A:
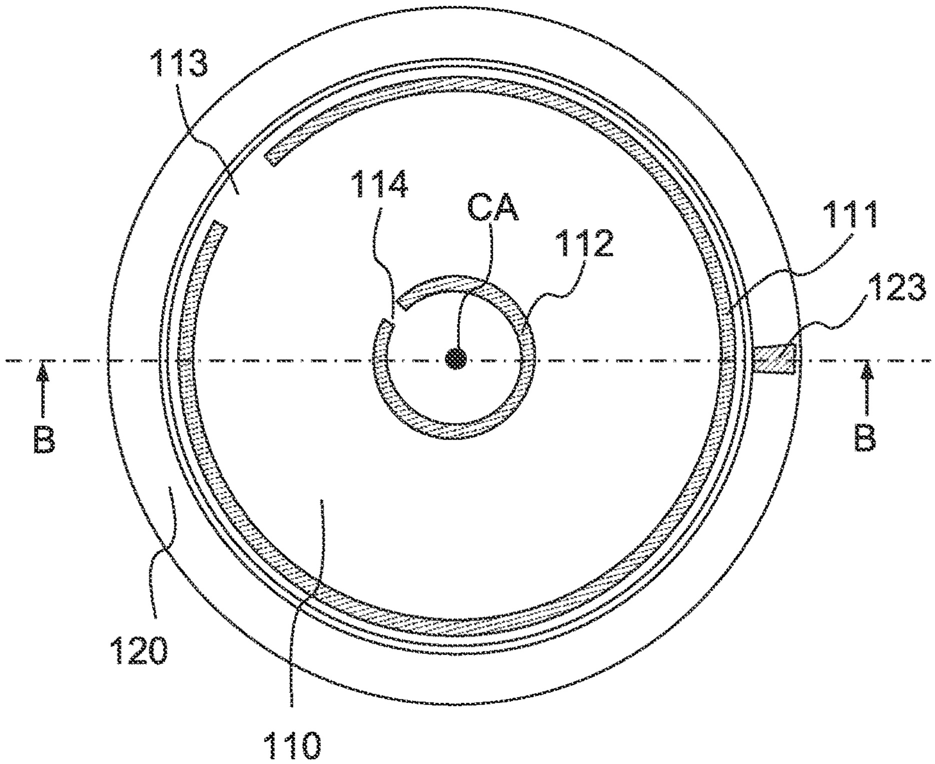
FIG. 5A is a plan view of a first pressing member and a second pressing member.
Figure 5B:
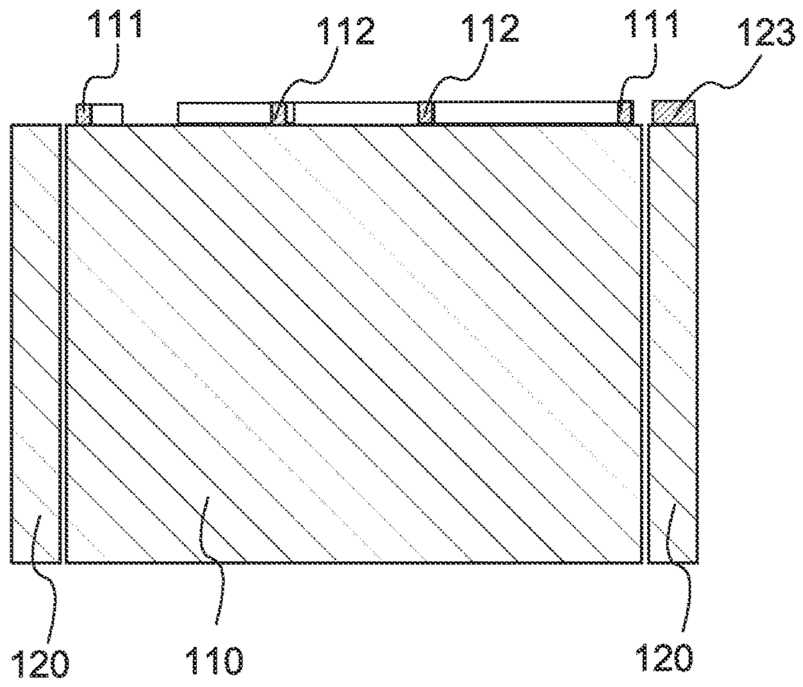
FIG. 5B is a cross-sectional view taken along line B-B of FIG. 5A.

Diaphragm 251*b* of first membrane valve 251 bends toward the opposing partition wall 251*b* when the diaphragm is pressed by first protrusion 111 of first pressing member 110 illustrated in FIGS. 5A and 5B. Diaphragm 251*b* thus functions as a valve body for a valve. For example, when first protrusion 111 is not pressing diaphragm 251*b* of first membrane valve 251, membrane pump 240 and first chamber 211 communicate with each other through the gap between diaphragm 251*b* and partition wall 251*a*. On the other hand, when first protrusion 111 is pressing diaphragm 251*b* so that the diaphragm contacts partition wall 251*a*, membrane pump 240 and first chamber 211 do not communicate with each other.

Similarly, diaphragm 252*b* of second membrane valve 252 bends toward corresponding partition wall 252*a* when the diaphragm is pressed by second protrusion 112 of first pressing member 110 illustrated in FIGS. 5A and 5B. Diaphragm 252*b* thus functions as a valve body for a valve. For example, when second protrusion 112 is not pressing diaphragm 252*b* of second membrane valve 252, first chamber 211 and second chamber 212 communicate with each other through the gap between diaphragm 252*b* and partition wall 252*a*. On the other hand, when the second protrusion is pressing diaphragm 252*b* so that the diaphragm contacts partition wall 252*a*, first chamber 211 and second chamber 212 do not communicate with each other.

As illustrated in FIG. 4A, first membrane valve 251 is disposed under the wall that defines first chamber 211. By disposing first membrane valve 251 under the wall in this manner, it is possible to prevent, for example, distortion when first pressing member 110 presses first membrane valve 251.

Similarly, as illustrated in FIG. 4B, second membrane valve 252 is disposed under the wall that defines first chamber 211. By disposing second membrane valve 252 under the wall in this manner, it is possible to prevent, for example, distortion when first pressing member 110 presses second membrane valve 251.

As illustrated in FIGS. 1, 2, and 4A, membrane pump 240 is a space which has a substantially arc shape ("C" shape) in bottom view and is formed between main body 210 and film 220. Membrane pump 240 is connected to the plurality of first channels 221 on the one end side, and connected to vent hole 241 on the other end side. In the present embodiment, as illustrated in FIG. 4A, membrane pump 240 is composed of the bottom surface of main body 210 and diaphragm 242 facing the bottom surface while being separated from the bottom surface. Diaphragm 242 is a portion of flexible film 220. Diaphragm 242 is disposed along the circumference of a third circle concentric with the first circle whose center is central axis CA. This third circle is disposed outside the first circle and the second circle described above. The shape of a cross section—orthogonal to the circumference—of diaphragm 242 is not limited, and is arc-shaped in the present embodiment.

Diaphragm 242 of membrane pump 240 bends and contacts main body 210 when the diaphragm is pressed by third protrusion 123 of second pressing member 120 illustrated in FIGS. 5A and 5B. For example, when third protrusion 123 slides on and presses diaphragm 242 from the connection part with vent hole 241 toward the connection part with first channel 221 (counterclockwise in FIG. 2), the fluid in membrane pump 240 moves toward first channel 221, and the pressure inside first channel 221 becomes positive. On the other hand, when third protrusion 123 slides on and presses diaphragm 242 from the connection part with first channel 221 toward the connection part with vent hole 241 (clockwise in FIG. 2), the fluid in first channel 221 moves toward membrane pump 240, and the pressure inside first channel 221 becomes negative.

Vent hole 241 is a hole for introducing fluid (for example, air) into membrane pump 240 or discharging fluid (for example, air) from membrane pump 240 when third protrusion 123 of second pressing member 120 slides on and presses diaphragm 242 of membrane pump 240. In the present embodiment, vent hole 241 is composed of a through hole in main body 210 and film 220 blocking one of the openings of the through hole. The shape and size of vent hole 241 are not limited, and can be appropriately set as necessary. Vent hole 241 has, for example, a substantially cylindrical shape. The width of vent hole 241 is, for example, approximately 2 mm.

FIG. 5A is a plan view of first pressing member 110 and second pressing member 120, and FIG. 5B is a cross-sectional view taken along line B-B of FIG. 5A. FIG. 5A illustrates first protrusion 111, second protrusion 112, and third protrusion 123 with hatching for easy viewing.

First pressing member 110 includes first protrusion 111 disposed on the outer side and a second protrusion disposed on the inner side. As illustrated in FIG. 5A, in the present embodiment, first protrusion 111 and second protrusion 112 each have an arc shape ("C" shape) corresponding to a portion of a circle whose center is central axis CA. As first protrusion 111 and second protrusion 112 have an arc shape, first recess 113 and second recess 114 are formed, respectively, as illustrated in FIG. 5A. First protrusion 111 is used to close first membrane valve 251 and first recess 113 is used to open first membrane valve 251. Similarly, second protrusion 112 is used to close second membrane valve 252 and second recess 114 is used to open second membrane valve 252.

First protrusion 111 projects relatively with respect to first recess 113, and first recess 113 is recessed relatively with respect to first protrusion 111. In other words, first protrusion 111 and first recess 113 may have any configurations as long as the first protrusion functions as a pressing part, and the first recess functions as non-pressing part. For example, in the example illustrated in FIG. 5B, first protrusion 111 projects from the top surface (reference surface) of first pressing member 110, and the bottom surface of first protrusion 113 is at the same height as the top surface (reference surface) of first pressing member 110. Alternatively, the top surface of first protrusion 111 may be at the same height as the top surface (reference surface) of first pressing member 110. In this case, first recess 113 is recessed from the top surface (reference surface) of first pressing member 110. Second protrusion 112 and second recess 114 have the same configuration.

In the embodiment illustrated in FIGS. 5A and 5B, first protrusion 111 (first recess 113) and second protrusion 112 (second recess 114) rotate simultaneously. In addition, as illustrated in FIG. 5A, first recess 113 and second recess 114 face the same direction radially from central axis CA, in plan view. This configuration allows first membrane valve 251 and second membrane valve 252, which are connected to the same first chamber 211, to be in an opened state simultaneously.

In the example illustrated in FIGS. 5A and 5B, first protrusion 111 (first recess 113) and second protrusion 112 (second recess 114) rotate simultaneously; however, embodiments of the present invention are not limited thereto. For example, first protrusion 111 (first recess 113) and second protrusion 112 (second recess 114) may rotate independently. In this case, the following configuration is possible: fluid handling system 100 includes an outer pressing member including first protrusion 111 (first recess 113) and an inner pressing member including second protrusion 112 (second recess 114), in place of first pressing member 110; and the outer pressing member and the inner pressing member independently rotate about central axis CA.

Second pressing member 120 includes third protrusion 123 disposed on its top surface. Second pressing member 120 is rotatable about central axis CA. Second pressing member 120 is rotated by an external drive mechanism (not illustrated).

Third protrusion 123 slides on and presses diaphragm 242 of membrane pump 240 to operate membrane pump 240. Third protrusion 123 is disposed on the circumference of a circle whose center is central axis CA. Third protrusion 123 may have any shape as long as membrane pump 240 can be operated appropriately. In the present embodiment, third protrusion 123 in plan view has a shape of an arc corresponding to a portion of a circle whose center is central axis CA.

Operation of Fluid Handling System and Fluid Handling Device

Hereinafter, the operation of fluid handling system 100 and fluid handling device 200 will be described with reference to FIGS. 6A to 8. Specifically, the relationship between the opening and closing of each valve, the operation of each membrane pump, and the movement of a fluid (liquid) will be described. Regarding first membrane valves 251 and second membrane valves 252 in FIGS. 6A to 8, when a valve is pressed and blocked by first protrusion 111 (or second protrusion 112) of first pressing member 110, the valve is indicated by a black circle, and when a valve is not blocked because first recess 113 (or second recess 114) is facing the valve, the valve is indicated by an unfilled circle, for convenience of explanation. FIGS. 6A to 8 illustrate a series of transferring of a liquid from being housed in one of the plurality of first chambers 211 to be transferred to second chamber 212, and then to be transferred to another first chamber 211.

Figure 6A:
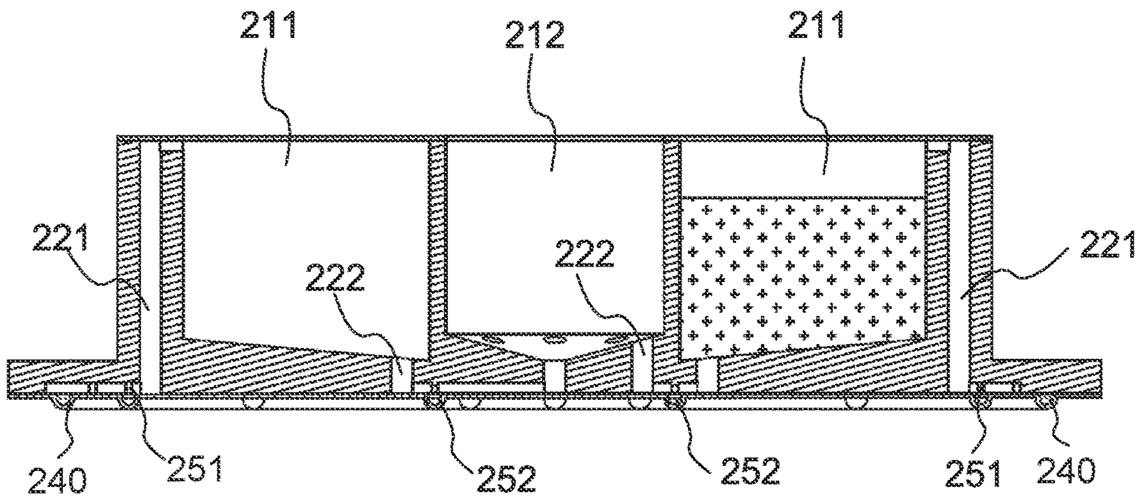
FIGS. 6A and 6B are diagrams for explaining the operation of the fluid handling system according to the embodiment.
Figure 6B:
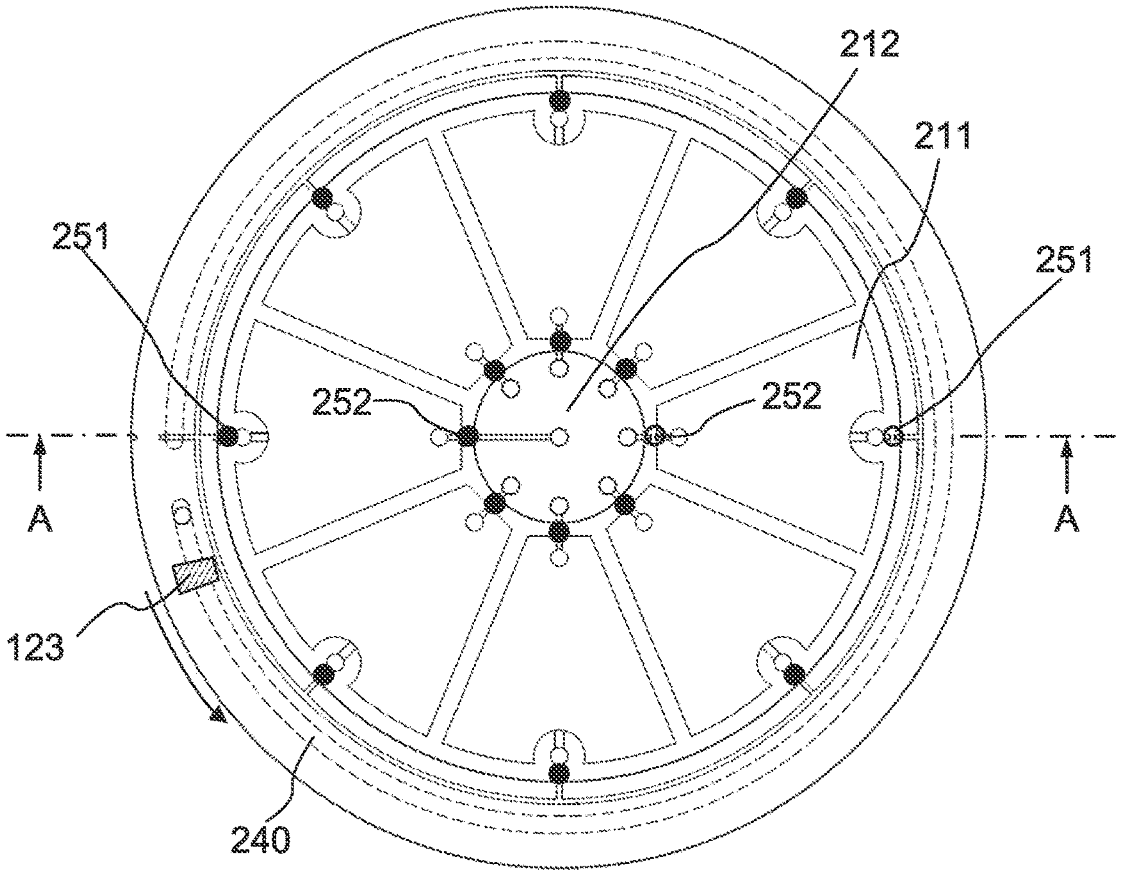
Figure 7A:
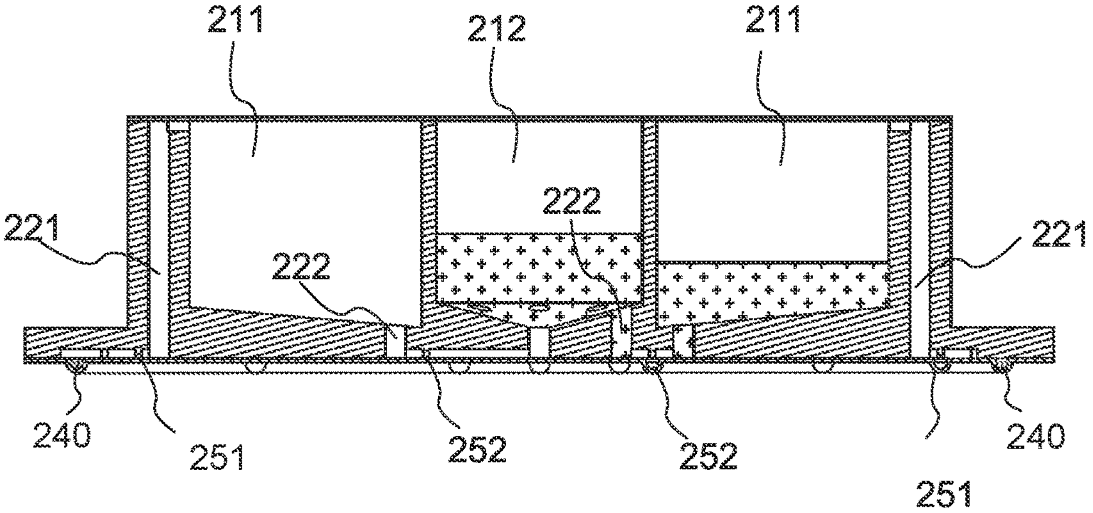
FIGS. 7A and 7B are diagrams for explaining the operation of the fluid handling system according to the embodiment.
Figure 7B:
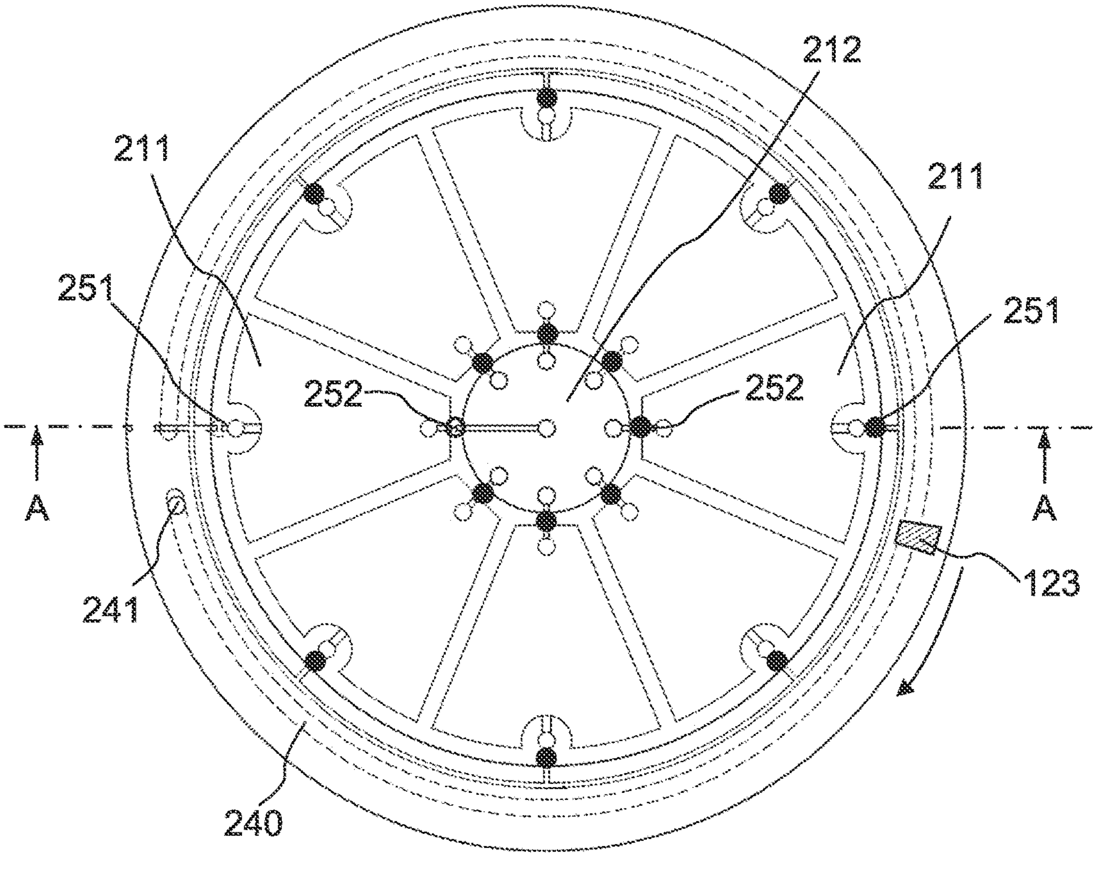
Figure 8:
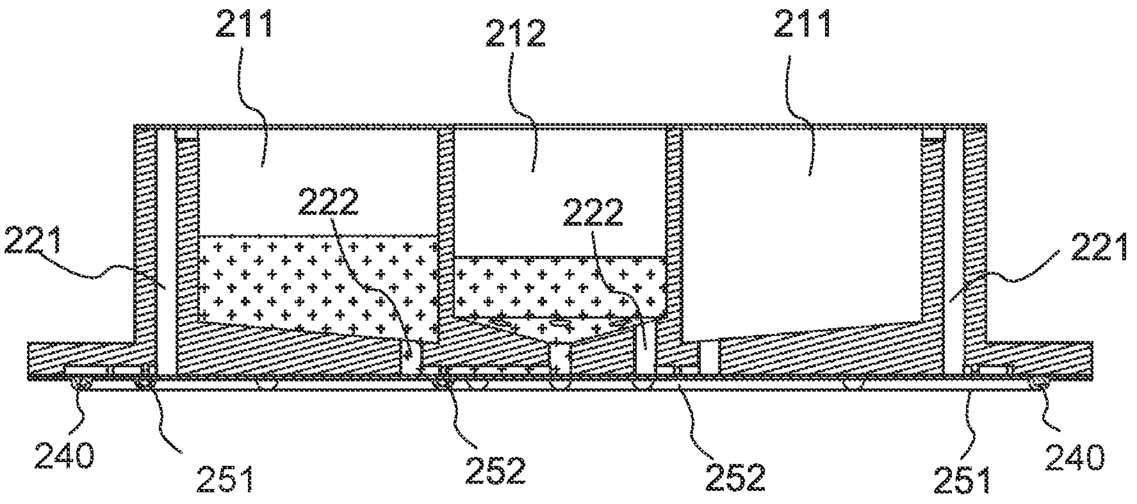
FIG. 8 is a diagram for explaining the operation of the fluid handling system according to the embodiment.

FIGS. 6A, 7A, and 8 are cross-sectional views taken along line A-A of FIGS. 6B and 7B. In addition, liquid is illustrated in FIGS. 6A, 7A, and 8, but is omitted in FIGS. 6B and 7B.

First, as illustrated in FIG. 6A, a liquid is housed in first chamber 211. In this example, first chamber 211 housing the liquid is the rightmost first chamber 211 in FIG. 6B. Subsequently, first membrane valve 251 is opened so that first chamber 211 housing the liquid communicates with membrane pump 240, as illustrated in FIG. 6B. Specifically, first pressing member 110 illustrated in FIGS. 5A and 5B is rotated in such a way that first recess 113 of first pressing member 110 is positioned at first membrane valve 251 located between membrane pump 240 and first chamber 211 housing the liquid.

In the present embodiment, first recess 113 and second recess 114 of first pressing member 110 move together (see FIGS. 5A and 5B). Therefore, when first recess 113 is positioned as described above, second recess 114 is positioned at second membrane valve 252 located between second chamber 212 and first chamber 211 housing the liquid. As a result, first chamber 211 housing the liquid and second chamber 212 communicate with each other, as illustrated in FIG. 6B.

As illustrated in FIG. 6B, third protrusion 123 of second pressing member 120 is then rotated counterclockwise to send air through first channel 221 into first chamber 211 housing the liquid to increase the pressure in the first chamber.

As a result, the liquid is transferred to second chamber 212 through second channel 222, as illustrated in FIG. 7A. During the procedure, for example, a reagent is housed in second chamber 212 in advance, and when the liquid is transferred, the regent and the liquid are mixed, thereby starting a reaction.

As illustrated in FIG. 7B, second membrane valve 252 is then opened to allow communication between second chamber 212 housing the liquid and first chamber 211 to which the liquid is to be transferred. In this example, first chamber 211, to which the liquid is to be transferred, is the leftmost first chamber 211 in FIG. 7B.

Specifically, first pressing member 110 illustrated in FIGS. 5A and 5B is rotated in such a way that second recess 114 of first pressing member 110 is positioned at second membrane valve 252 located between first chamber 211, to which the liquid is to be transferred, and second chamber 212. In the present embodiment, in the same manner as described above, first recess 113 and second recess 114 of first pressing member 110 move together (see FIGS. 5A and 5B). Therefore, when second recess 114 is positioned as described above, first recess 113 is positioned at first membrane valve 251 located between the first chamber, to which the liquid is to be transferred, and membrane pump 240. As a result, first chamber 211, to which the liquid is to be transferred, and membrane pump 240 communicate with each other, as illustrated in FIG. 7B.

As illustrated in FIG. 7B, third protrusion 123 of second pressing member 120 is then rotated clockwise. By this procedure, the air in first chamber 211, to which the liquid is to be transferred, can be sucked into membrane pump 240 through first channel 221 while air is discharged from vent hole 241. First chamber 211, to which the liquid is to be transferred, thus can be depressurized.

As a result, the liquid is transferred from second chamber 212 to first chamber 211 through second channel 222, as illustrated in FIG. 8. In this example, for example, the liquid housed in second chamber 212 is a liquid after the reaction, which can be discarded by transferring the liquid to first chamber 211.

According to the above described procedure, appropriately rotating first pressing member 110 and second pressing member 120 can send a fluid in first chamber 211 to second chamber 212 or send a fluid in second chamber 212 to first chamber 211.

Effects

As described above, fluid handling system 100 according to the present embodiment can perform operations such as mixing, reacting, and discarding fluids without requiring a large-scale device.

INDUSTRIAL APPLICABILITY

Fluid handling devices and fluid handling systems of the present invention are particularly advantageous, for example, in a variety of applications such as clinical, food, and environmental testing.

REFERENCE SIGNS LIST

100 Fluid handling system
110 First pressing member
111 First protrusion
112 Second protrusion
120 Second pressing member
123 Third protrusion
200 Fluid handling device
210 Main body
211 First chamber
212 Second chamber
220 Film
221 First channel
221*a* First bottom surface side channel
221*b* First in-body channel
221*c* Opening
222 Second channel
222*a* Second bottom surface side channel
222*b* Second in-body channel
230 Lid
240 Membrane pump
241 Vent hole
242, 251*b*, 252*b* Diaphragm
251 First membrane valve
251*a*, 252*a* Partition wall
252 Second membrane valve
CA Central axis

The invention claimed is:

1. A fluid handling device, comprising:

a plurality of first chambers;

a second chamber;

a membrane pump including a diaphragm;

a plurality of first channels each connecting a corresponding one of the plurality of first chambers with the membrane pump;

a plurality of second channels each connecting a corresponding one of the plurality of first chambers with the second chamber;

a plurality of first membrane valves respectively disposed in the plurality of first channels; and a plurality of second membrane valves respectively disposed in the plurality of second channels, wherein each of the plurality of first channels is configured to transmit positive pressure or negative pressure from the membrane pump to the corresponding one of the plurality of first chambers, wherein each of the plurality of second channels is configured to allow fluid to move between the corresponding one of the plurality of first chambers and the second chamber, wherein each of the plurality of first channels is different from each of the plurality of second channels, wherein the plurality of first membrane valves are disposed on a circumference of a first circle, wherein the plurality of second membrane valves are disposed on a circumference of a second circle concentric with the first circle, wherein the diaphragm of the membrane pump is disposed on a circumference of a third circle concentric with the first circle, and wherein a radius of the first circle is greater than a radius of the second circle, and a radius of the third circle is greater than the radius of the first circle.

2. The fluid handling device according to claim 1, wherein a bottom surface of each of the plurality of first chambers includes an inclined surface.

3. The fluid handling device according to claim 1, wherein a bottom surface of the second chamber includes an inclined surface.

4. The fluid handling device according to claim 1, wherein each of the plurality of first membrane valves is disposed under a wall defining a corresponding one of the plurality of first chambers.

5. The fluid handling device according to claim 1, wherein each of the plurality of second membrane valves is disposed under a wall between a corresponding one of the plurality of first chambers and the second chamber.

6. A fluid handling system, comprising:

the fluid handling device according to claim 1;

a first pressing member for pressing the plurality of first membrane valves and the plurality of second membrane valves; and a second pressing member for pressing the membrane pump.

7. The fluid handling system according to claim 6, wherein the first pressing member and the second pressing member are configured to rotate about a rotation axis passing through a center of the first circle.

* * * * *